United States Patent [19]

McClive

[11] 3,879,292

[45] Apr. 22, 1975

[54] DESICCANT DEVICE

[75] Inventor: Ralph T. McClive, Kenmore, N.Y.

[73] Assignee: Clecon, Incorporated, Cleveland, Ohio

[22] Filed: Jan. 28, 1974

[21] Appl. No.: 437,332

Related U.S. Application Data

[63] Continuation-in-part of Ser. No. 236,057, March 20, 1972, Pat. No. 3,799,352.

[52] U.S. Cl. ............... 210/282; 210/287; 210/439; 210/DIG. 6
[51] Int. Cl. ............................................ B01d 27/02
[58] Field of Search ........................... 55/387–390; 210/169, 264, 266, 282–284, 287–289, 323, 437–439, 502, DIG. 6

[56] References Cited
UNITED STATES PATENTS

| 2,323,160 | 6/1943 | Stecher et al. | 210/287 X |
| 2,583,812 | 1/1952 | Briggs et al. | 210/502 X |
| 3,266,628 | 8/1966 | Price | 210/266 X |
| 3,595,395 | 7/1971 | Lorenzen | 210/169 |
| 3,680,707 | 8/1972 | Zeek | 210/266 |
| 3,799,352 | 3/1974 | McClive | 210/282 |

Primary Examiner—Charles N. Hart
Assistant Examiner—Robert H. Spitzer
Attorney, Agent, or Firm—Teare, Teare & Sammon

[57] ABSTRACT

A cartridge desiccant device with an integral, mechanical filter adapted for use in removing solid particles and moisture from the refrigerant fluid in refrigerant systems. The device comprises a body which receives the desiccant and is pervious to the passage of refrigerant fluid through it and at least one foraminous member sealed to the body to mechanically filter the fluid passing through the body. In one form, the body of the device includes an external conduit or passageway defined by the external surface of an exterior side wall adopted to receive a fluid conduit to enable flow of refrigerant through the device for removal of moisture therefrom.

10 Claims, 3 Drawing Figures

DESICCANT DEVICE

This application is a continuation-in-part of my copending U.S. application Ser. No. 236,057 filed Mar. 20, 1972, now U.S. Pat. No. 3,799,352.

BACKGROUND OF THE INVENTION

The present invention relates to refrigerant systems. More particularly, the present invention relates to a device for removing moisture and solid particles from the fluid flowing through the closed refrigerant systems, such as may be found in commercial, domestic or automobile air conditioning units. A device of this nature is contained within the refrigerant system in a suitable housing where the refrigerant fluid may pass over and/or through it for treatment.

Previously, desiccant devices had been provided in woven fabric sleeving where at least some of the fluid could bypass the desiccant by flowing through the space between the housing and the sleeving. In the past, some provision had been made for mechanical filtration of the fluid by using a second portion of the sleeving as a filter bag. These sleeving units had to be sealed to an inlet or outlet by a separate operation, such as by wiring into place. Since an extended length of sleeving was used for the filtration, separate internal support was provided to prevent collapse of the sleeving under fluid flow.

SUMMARY OF THE INVENTION

The desiccant device of the present invention is adapted for use in a refrigerant system and provides a solid particle impervious, refrigerant fluid pervious, receptacle. The device comprises:

a. A hollow cartridge-like body which includes an endless exterior wall member.
b. At least one pair of foraminous members formed of a generally solid particle impervious, refrigerant fluid pervious material sealingly engaged to the exterior wall member, with the wall and foraminous members defining the aforesaid receptacle.
c. A desiccant material disposed within the receptacle, and
d. An external conduit or passageway defined by the external surface of said wall member adopted to receive a fluid conduit to enable flow of refrigerant through the device for removal of moisture therefrom.

This construction provides an integral, solid particle filtering and moisture desiccant device through which refrigerant fluid is capable of flowing. In addition, the foraminous members may extend uniformly beyond the transverse periphery of the wall member to provide a sealing member capable of sealing engagement with a housing for the device. This sealing generally prevents bypassing of the foraminous members by the refrigerant fluid.

It is an object of the present invention to provide a solid particle filter and desiccant device in a single compact and integral unit. Further, the device of the present invention minimizes bypassing of the filter or the desiccant, or preferably both, by refrigerant fluid. In addition, the device is capable of easy installation into its housing and is of a self-supporting construction so as not to collapse under fluid flow.

DESCRIPTION OF THE PREFERRED EMBODIMENTS

Figure 1:
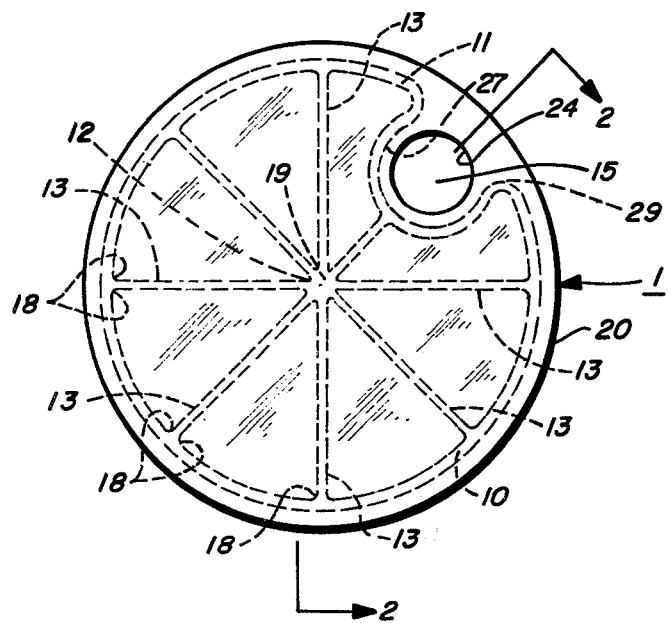
FIG. 1 is a top plan view illustrating the preferred embodiment of the desiccant device 1 of the present invention.

The desiccant device 1 of the present invention generally, in its preferred form and as illustrated in FIG. 1, comprises a perforate body 10 and a pair of foraminous members 20 and 22 for receiving and containing desiccant material D for refrigerant fluid. The body 10, in preferred form, comprises an exterior wall member 11 and a plurality of spacing ribs 13 interconnecting, as at 18, the wall member 11 via a center post web or post 19. The foraminous members 20 and 22, in preferred form, comprise an upper foraminous member 20 and a lower foraminous member 22 which are sealingly joined to the body to define a fluid pervious, generally solids impervious, closed receptacle. The body 10 and upper and lower foraminous members 20 and 22 along with the desiccant material D conjointly act to mechanically filter solid contaminants from the refrigerant fluid flow and to desiccate or remove moisture from that flow. The device 1 in FIG. 3 has been illustrated in the drawings with only a portion of its desiccant load in order that the internal features of the device can be more clearly seen.

Figure 2:
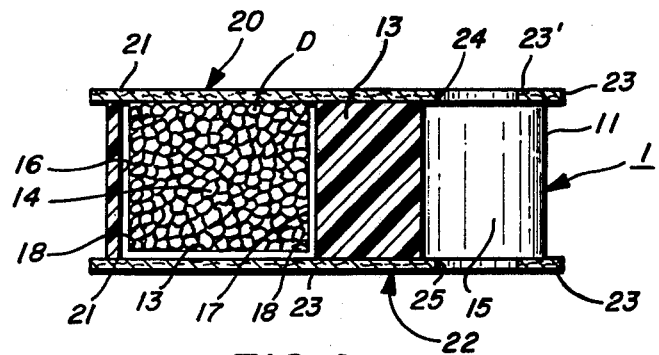
FIG. 2 is a section view taken along the line 2—2 of FIG. 1.
Figure 3:
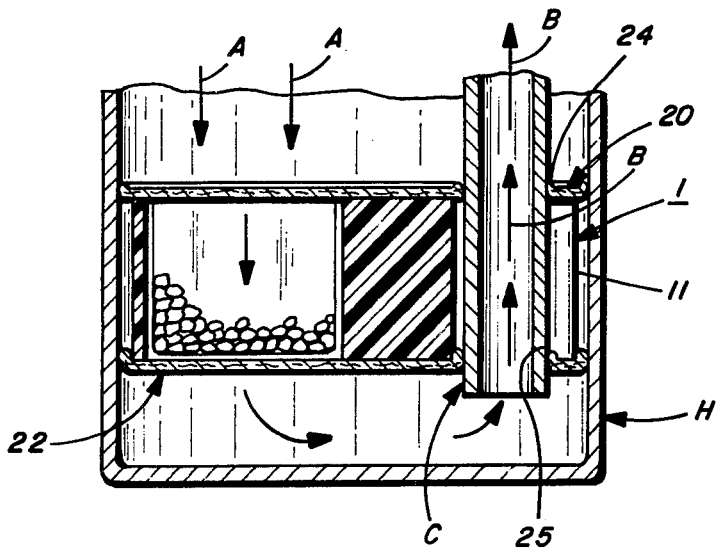
FIG. 3 is a fragmentary side elevation view, partially in section, of the embodiment of FIG. 1, as shown in FIG. 2 with the device 1 diagrammatically illustrated within a housing in a closed refrigerant system.

In the preferred embodiment of the device 1 (and as illustrated in FIG. 1), the body 10 comprises a cylindrical exterior wall member 11 and provides an interior conduit space 14 (FIG. 2) that contains the desiccant material D for flow of the refrigerant fluid through it in a first direction (as shown by the arrows A in FIG. 3). As shown, the wall 11 is recessed inwardly to provide an axially extending keyway-like slot 15 defined by the interior surface 27 of the wall which may be formed to accommodate a conduit or pipe C for conducting filtered and desiccated refrigerant fluid in a second or reverse direction (as shown by the arrows B in FIG. 3). The internal shape of the slot preferably has a configuration which generally corresponds to that of conduit C, but communicates with or opens onto the exterior of the device so that the conduit is located exteriorly of the wall 11. In the embodiment shown, the surface 27 is semi-circular so as to define a generally C-shaped configuration which opens in a direction away from the longitudinal central axis of the body with rounded end portions 29.

The external surface of the exterior wall member 11 may have a configuration which generally corresponds to the corresponding transverse configuration of the housing H in which the device 1 is to be disposed (see FIG. 3). In addition, a clearance may be provided between the exterior wall member 11 and the housing H to facilitate insertion of the device into the housing H. Moreover, the transverse dimension of the external surface of the exterior wall member 11 is preferably less than the corresponding transverse interior dimension of the housing H. Also, a clearance is preferably provided between the interior wall surface 27 and the conduit C to facilitate installation of the device 1 around the conduit C. It is understood, however, that the transverse dimension of the slot 15 defined by the surface 27 can be substantially the same as that of the conduit C so as to provide a tight or press fit mounting of the device onto the conduit C. By providing relatively small clearances between the exterior wall member 11 and the housing H and between the interior wall surface 27 and the conduit C, substantially the entire refrigerant fluid flow passes through the desiccant material so as not to bypass the desiccant.

Preferably, the wall member 11 has a height sufficient to provide sufficient depth to the bed of desiccant material D so that the refrigerant fluid is effectively desiccated under the existing flow conditions. The exterior wall member 11 and the interior wall member 12 are preferably provided with internal reinforcing ribs 16 and external reinforcing ribs 17, respectively, which extend axially of their associated wall members 11 and 12 to rigidify them. In the embodiment shown, these sets of reinforcing ribs 16 and 17 are equally arcuately and equally angularly spaced so that the spacing ribs 13 can extend radially outwardly from the lower edge of the interior wall member 12 to the lower edge of the exterior wall member 11 in a symmetrical pattern. The spacing ribs 13 are joined to the reinforcing ribs 16 and 17 so as to reinforce the joinder of the spacing ribs 13 to the wall members 11 and 12. By this arrangement, a relatively thin width and height spacing rib construction can be used to maximize fluid flow while still providing firm and positive location of the wall members 11 and 12 with respect to each other. To further reinforce the joinder to the ribs 13, each junction may be provided with fillets 18 (FIG. 1). Preferably, the body's components are formed of a rigid or semi-rigid material, such as a rigid or semi-rigid polymeric material. Polypropylene, polystyrene and a similar synthetic polymeric material may be used successfully.

The foraminous members 20 and 22 of the preferred embodiment of the device 1 comprise flexible, generally planar, fluid pervious and solid particle impervious sheets, such as felted sheet material, or the like. The upper and lower foraminous members 20 and 22 are sealed to the upper and lower edges, respectively, of the wall member by weldments, as at 21, (FIG. 2) to prevent refrigerant fluid from generally bypassing the filtering action of a foraminous member on its way to and/or from the desiccant material. The sealing weldments 21 act to mechanically secure the foraminous members 20 and 22 to the body 10, thereby enclosing the desiccant material D and preventing its leakage from the device 1.

In order to weld or fuse the rigid or semi-rigid material, such as is used in the body 10, to a felted, fibrous material, such as is used in each foraminous member, it has been preferable to use an ultrasonic welding technique. In this technique, vibrational mechanical energy of an ultrasonic frequency is imparted to the felt material and transmitted to the joint interface between the felt and rigid materials. There it creates frictional heat and melts the interface materials, fusing them together and providing the desired sealing weldment.

Preferably, each foraminous member 20 and 22 is apertured so that the slot 15 is open at both ends so that the conduit C may be emplaced within the slot 15. Each aperture 24 and 25 may be configured so as to generally correspond to the external configuration of the conduit C so as to be capable of providing a sealing coaction therebetween. In the form shown, each aperture is of an endless shape, such as circular. Preferably, the transverse internal dimensions of each aperture should be slightly less than the corresponding transverse external dimensions of the conduit C so that each foraminous member 20 and 22 has a flap-like edge 23' so as to sealingly engage the conduit C. By this arrangement, the device may be held in a friction slide or press-fit around the conduit C which then may act as a support to facilitate a preassembled installation of the component parts. In a similar manner, the outer periphery of each foraminous member 20 and 22 may be correspondingly configured to the corresponding transverse internal configuration of the housing H so that the members 20 and 22 can sealingly mate with the housing H, if desired.

In the form shown, each foraminous member has a circular outer periphery. The transverse external dimensions of each foraminous member may be greater than the corresponding internal transverse dimensions of the housing H so that each foraminous member may sealingly engage the housing H. Each foraminous member extends beyond the outer periphery of the exterior wall member 11 and, hence, overlies or extends beyond transverse peripheries of the body 10 so as to provide a flaplike edge 23 for sealing engagement, as desired. The sealing engagement between each foraminous member and the conduit C and the housing H acts to prevent the solids from bypassing the filtering action of the foraminous members 20 and 22 while allowing some bypassing of the refrigerant fluid due to the fluid pervious material at the flap-like edges 23.

In order to provide the desired filtering action by the foraminous members 20 and 22, it is preferred that they be composed of sheets of non-woven, or felted, fibrous material of sufficient thickness to mechanically filter out and trap undesired solid particles, such as solder particles, desiccant fragments, contaminating dirt particles, or the like. Preferably, the foraminous members are made from a polymeric material which can be compatibly fused or welded to the body 10, as aforesaid. Preferably, the non-woven fibrous material may be a polymeric felt, such as a polypropylene, or polyester felt, and is preferably made from the same polymeric material as the body.

In one form, the device 1 may be installed in the housing H (FIG. 3) by pre-assembling the device around the conduit. In such case, the free end of the conduit C is simply inserted through the uppermost aperture 24 and then through the next or lowermost aperture 25 until it extends to the desired distance below the lower foraminous member 22. During this insertion, the marginal edges 23' of the respective apertures 24 and 25 flex to accomodate the transverse dimension of the conduit, whereupon the device will be held in frictional support engagement on the conduit. Thus assembled, the device 1 carried by the conduit C is inserted, as a unit, down into the housing H wherein the edges 23 of the respective foraminous members 20 and 22 sealing engage in a wiping action the confronting interior surfaces of the housing. Upon seating of an end cap (not shown) attached to the upper end of the conduit upon the upper end of the housing, the installation is complete and ready for operation. During operation of the refrigerant system (FIG. 3), substantially the entire refrigerant fluid flow would pass through the upper foraminous member 20 where it would be initially mechanically filtered, then through the desiccant material where it would be desiccated and finally through the lower foraminous member 22 where it would be filtered a second time before being exhausted through the conduit C, as seen in FIG. 3. It is to be understood, however, that the body 10 could be flush fit within the housing without the flap edges 23 or slightly loose fit, as desired. This also applies to the edges 23 around the conduit C to allow no bypassing or slight bypassing around the members, as desired.

While the foraminous members 20 and 22 have been disclosed as preferably non-woven, or felted material, a woven, or mesh, material might be used. The external surface of the exterior wall member 11 has been disclosed as circular in top plan (or as infinite-sided polygons) to correspond to a circular housing H and a circular conduit C respectively. In those instances where either the housing H, or the conduit C, or both, are polygonal in top plan (or are finite-sided polygons), the external surface of exterior wall member 11, or the internal surface 27, or both, respectively, should have a corresponding polygonal shape in top plan. In addition, the external periphery of each foraminous member 20 and 22, and the apertures 24 and 25, should be similarly configured. In those instances where a bypassing of the refrigerant around the foraminous members and the desiccant is permissable, the sealing engagement between the device and the housing H, or the conduit C, or both, may be eliminated, as desired. In those instances where multiple conduits C are used, the body 10 would be provided with a corresponding number of apertures suitably disposed to accomodate the conduits.

By the foregoing construction and interrelation of its component elements, the present invention's desiccant device provides an integral solid particle filter and moisture desiccant. The device is capable of minimizing refrigerant fluid bypass of the particle filter and moisture desiccant. In one form, the device is constructed and arranged to allow free flow of refrigerant through the cartridge and to enable some flow to bypass the desiccant material to minimize pressure drop in the system. In view of its solid construction, the unit is selfsupporting under fluid flow and readily installed as a cartridge. Since, in preferred form, the unit is symmetrical with respect to a transverse, or horizontal plane passing through the midpoint of its height, it can be installed with either foraminous member up, further facilitating installation thereof.

I claim:

1. A cartridge-type desiccant device of self-supporting construction containing a desiccant material adapted for replaceable installation in a refrigeration system of the type having a hollow housing for interiorly mounting said device for removing moisture from a refrigerant fluid, said desiccant device comprising,
    a hollow body member containing said desiccant material removably insertable in a bore in said housing in the path of refrigerant flow therethrough,
    said body member including axially rigid, endless exterior side wall made from a polymeric material and having upper and lower peripheral end edges, said side wall being of a fluid impervious, self-supporting construction having a maximum transverse dimension which is less than the corresponding minimum transverse dimension of the bore in said housing,
    said body including upper and lower flexible, filter members each made from a fluid pervious, polymeric fibrous material,
    the polymeric material of said body and filter members being heat fused onto the confronting surfaces of the associated upper and lower end edges of said body member,
    said body and filter members together defining a closed receptacle for containing said desiccant material and with said filter members conjointly acting with said desiccant material to mechanically filter solid particles and moisture from said refrigerant flow,
    said side wall having a recessed, key-way like slot extending axially between the end edges of said body member,
    said slot being made from and defined by the extended surface of said wall so as to be disposed completely exteriorly of the closed receptacle provided by said side wall,
    said slot being open at both ends and opening outwardly in a direction away from the longitudinal central axis of said body so as to receive a conduit exteriorly of said body which openly connects at one end with said bore to enable maximum filtration and moisture removal through said desiccant material and filter members while removing desiccated refrigerant flow from said bore through said conduit exteriorly of the body of said device.

2. A desiccant device in accordance with claim 1, wherein said slot is of a generally C-shaped configuration.

3. A desiccant device in accordance with claim 1, wherein said filter members extend outwardly over the open ends
    of said slot, and
    said filter members having apertures communicating with the open ends adapted for receiving said conduit therethrough.

4. A desiccant device in accordance with claim 1, wherein
    said filter members have recessed portions shaped to generally correspond to the shape of the open ends of said slot.

5. A desiccant device in accordance with claim 1, wherein
    said filter members are of a generally flat construction extending generally parallel to one another and generally normal to the longitudinal central axis of said body member,
    at least one of said filter members extending transversely outwardly beyond the outer periphery of said side wall to provide an endless flexible flap portion adapted to sealingly engage the confronting interior surface of said housing.

6. A desiccant device in accordance with claim 5, wherein
    said flap portion of a fluid pervious construction to enable refrigerant flow therethrough and adapted for mechanically filtering solid particles from said refrigerant flow thereby to retard general bypassing of refrigerant through the desiccant material of said desiccant device.

7. A desiccant device in accordance with claim 1, wherein
said body and filter members are made from polymeric materials selected from compatible heat fusible materials selected from the group consisting of polypropylene, polystyrene and the like.

8. A desiccant device in accordance with claim 1, wherein
said upper and lower filter members each extend transversely outwardly beyond the outer periphery of said side wall to provide a pair of said endless, flexible flap portions.

9. A desiccant device in accordance with claim 1, wherein
said filter members are made from a polymeric felt material of the type that is fusible by ultrasonic welding to the upper and lower edges of said side wall.

10. A unitary, one-piece desiccant device containing a desiccant material adapted for replaceable installation in a refrigeration system of the type having a cylindrical, hollow housing for interiorly mounting said device for removing moisture from a refrigerant fluid, said desiccant device comprising,
a cylindrical, hollow body member containing said desiccant material removably insertable in a bore in said housing in the path of refrigerant flow therethrough,
said body member including a substantially axially rigid, endless exterior side wall made from a polymeric material and having upper and lower peripheral end edges,
said side wall being of a fluid impervious, self-supporting construction having a maximum transverse dimension which is less than the corresponding minimum transverse dimension of the bore in said housing,
said body including upper and lower flexible, filter members each made from a fluid pervious, polymeric material,
said body and filter members being of the same polymeric material so that said upper and lower filter members are secured in heat fused and sealed engagement with confronting surfaces of the associated upper and lower end edges of said body member respectively,
said body and filter members together defining a closed receptacle for containing said desiccant material and with said filter members conjointly acting with said desiccant material to mechanically filter solid particles and moisture from said refrigerant flow,
said filter members being of a generally flat construction extending generally parallel to one another and generally normal to the longitudinal central axis of said body member,
at least one of said filter members extending transversely outwardly beyond the outer periphery of said side wall to provide an endless flexible flap portion adapted to engage the confronting interior surface of said housing, for mechanically filtering solid particles from said refrigerant flow therety to retard general bypassing of refrigerant through the desiccant material of said desiccant device,
said side wall having a recessed, key-way like slot extending axially between the end edges of said body member,
said slot being made from and defined by the extended surface of said wall so as to be disposed completely exteriorly of the closed receptacle provided by said side wall,
said slot being open at both ends and opening outwardly in a direction away from the longitudinal central axis of said body so as to receive a condiut exteriorly of said body which openly connects at one end with said bore to enable maximum filtration and moisture removal through said desiccant material and filter members while removing desiccated refrigerant flow from said bore through said conduit exteriorly of the body of said device.

* * * * *